United States Patent [19]

Tanner

[11] 4,380,050
[45] Apr. 12, 1983

[54] AIRCRAFT LOCATION AND COLLISION AVOIDANCE SYSTEM

[76] Inventor: Jesse H. Tanner, 361 Taylor Ave. Northwest, Renton, Wash. 98055

[21] Appl. No.: 164,042

[22] Filed: Jun. 30, 1980

[51] Int. Cl.³ .............................................. G01S 3/02
[52] U.S. Cl. ............................ 364/461; 343/112 CA
[58] Field of Search .............. 364/439, 441, 443, 460, 364/461; 343/112 C, 112 D, 112 TC, 112 CA, 5 CF, 5 CM; 340/23, 24, 25, 26, 27 NA; 371/22, 32–34

[56] References Cited

U.S. PATENT DOCUMENTS

| | | | |
|---|---|---|---|
| 3,250,896 | 5/1966 | Perkinson et al. | 364/461 |
| 3,310,806 | 3/1967 | Stansbury | 364/461 |
| 3,469,079 | 9/1969 | Stansbury | 364/461 |
| 3,787,665 | 1/1974 | Watson et al. | 343/112 CA |
| 3,808,598 | 4/1974 | Carter | 364/461 |
| 4,128,839 | 12/1978 | McComas | 343/112 CA |
| 4,196,474 | 4/1980 | Buchanan et al. | 364/461 |

*Primary Examiner*—Errol A. Krass
*Attorney, Agent, or Firm*—Seed, Berry, Vernon & Baynham

[57] ABSTRACT

A location system and method whereby the azimuth and range information of an aircraft with respect to a reference ground station is made available to other aircraft by transmission of a pulse at a time uniquely associated with the aircraft's location. A synthetic azimuth function and a synthetic range function provide a periodic mapping of an area. The synthetic azimuth function is a slowed, time-expanded representation of a conventional azimuth function. Each azimuth increment is allocated a time slot in the synthetic azimuth function. The synthetic azimuth function is synchronized by counting a number of synchronizing pulses from the conventional azimuth function, and a synthetic azimuth reference pulse is periodically transmitted from a reference ground station to synchronize all aircraft using the synthetic azimuth function. During the particular synthetic azimuth function time slot corresponding to an aircraft's azimuth, a pulse is transmitted and the aircraft's range is encoded as the time-delay of that pulse with respect to the most recent conventional azimuth synchronizing pulse, providing a synthetic range function which is embedded in one of the synthetic azimuth degree increments. Display and collision warning devices are also synchronized and operated by this location system.

33 Claims, 11 Drawing Figures

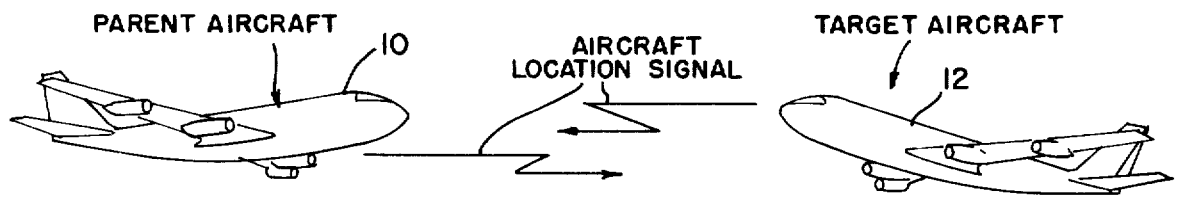
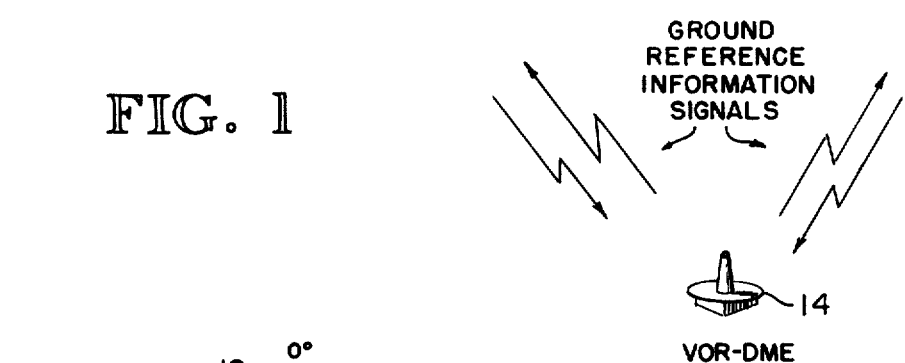
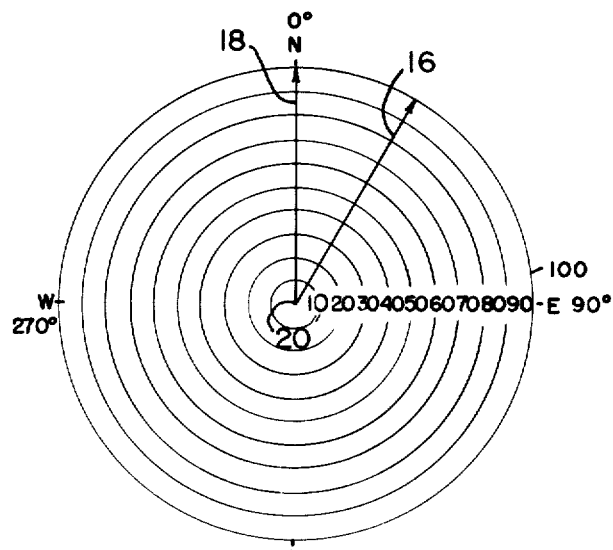
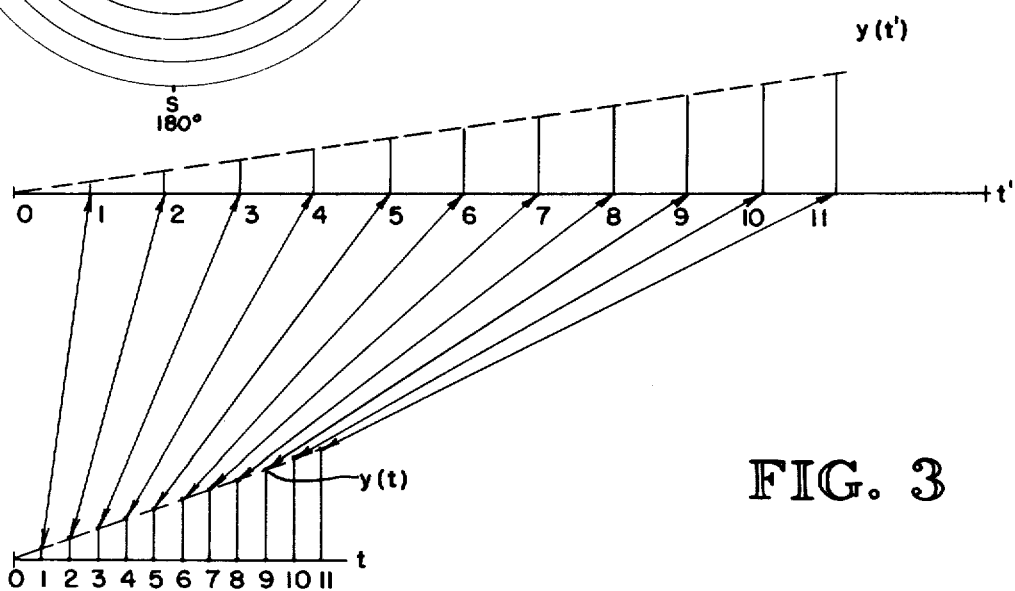
FIG. 1
FIG. 2
FIG. 3

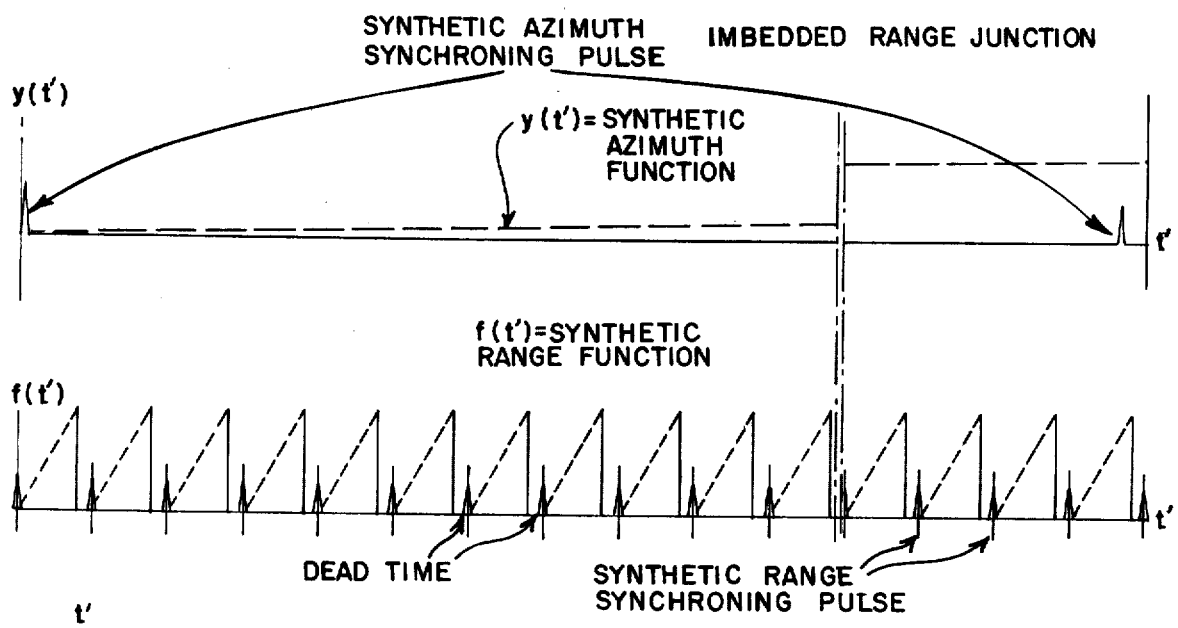
FIG. 4
FIG. 5
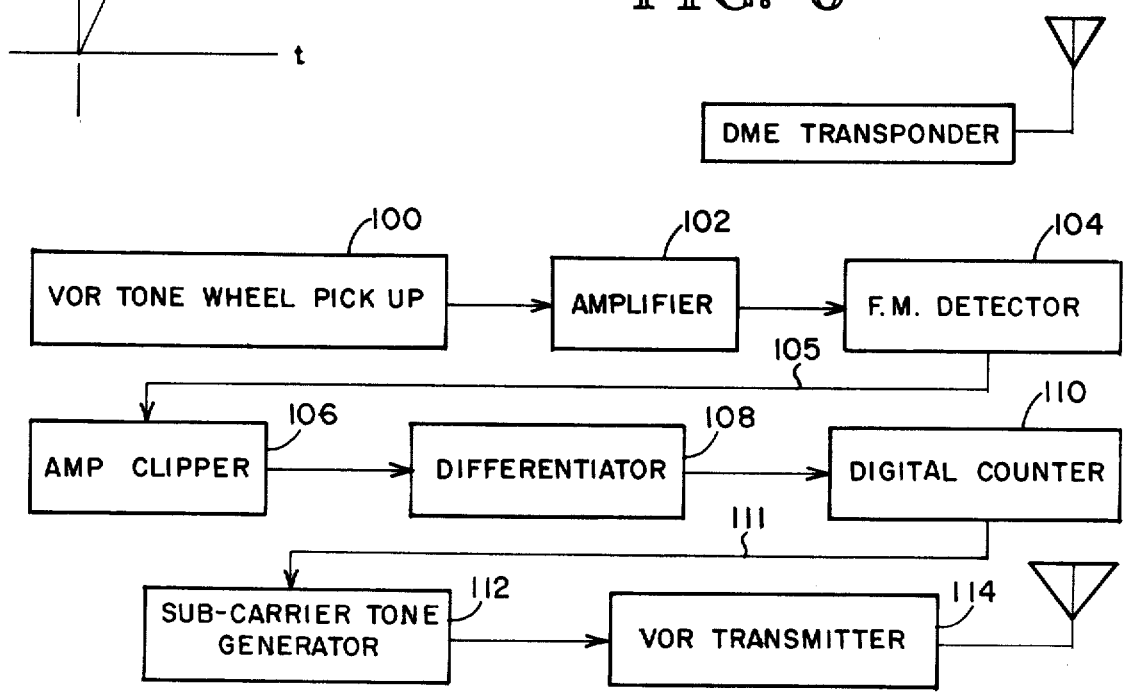
FIG. 6

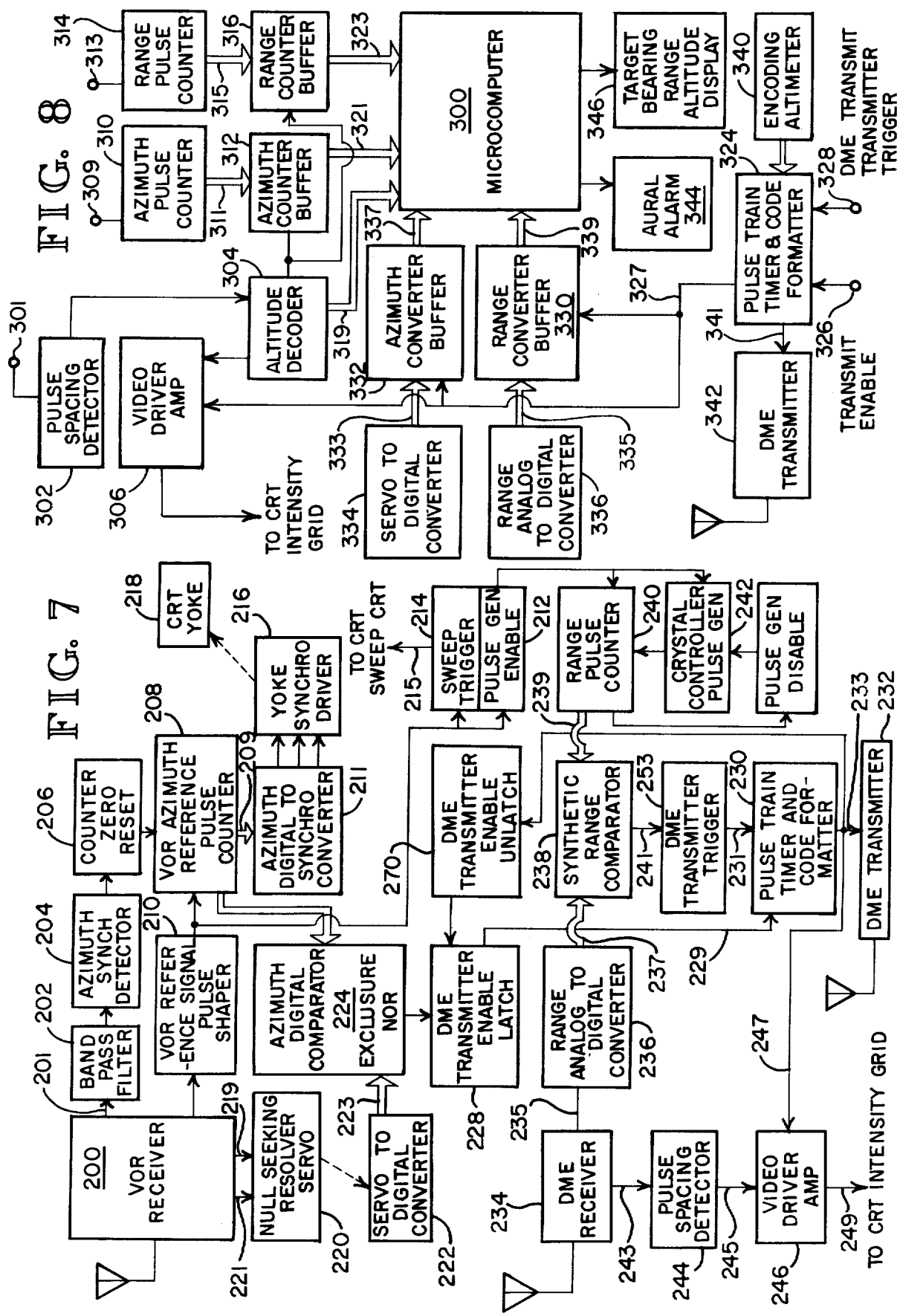

AIRCRAFT LOCATION AND COLLISION AVOIDANCE SYSTEM

BACKGROUND OF THE INVENTION

1. Field of the Invention

This invention relates to systems and methods for providing and displaying aircraft collision avoidance information.

2. Description of the Prior Art

Various prior systems provide information about the relative positions of aircraft in a particular airspace.

One system has ultra-precise, air-borne clocks aboard each aircraft to provide precise synchronizing reference signals, and each aircraft is prompted to simultaneously transmit an identification signal. Distance between aircraft is determined by measurement of the elapsed time between the transmission of an identification signal and receipt of that signal. This system provides only distance information and does not provide relative bearing or azimuth information. It is readily appreciated that maintenance of all of the ultra-precise, air-borne clocks is difficult. All of the aircraft within an airspace transmit identification signals at the same time, causing interference and confusion so that the ability of this type of system to resolve one signal from a large number of other signals is limited.

Another system uses a cooperative interrogation and reply technique whereby an interrogating aircraft transmits a signal and measures the elapsed time between the transmission of the signal and the receipt of a reply signal from a responding aircraft. The ability of the system to resolve the signals from each of a large number of aircraft occupying the same airspace is also limited.

A system whereby each aircraft carries its own expensive scanning radar system obviously presents problems of economics, not to mention the severe clutter and jamming caused by a large number of such systems operating within the same airspace.

Another system uses ground-based radar for determining the position of all aircraft within an airspace and transmits positional data to each aircraft by means of ground-based data transmission links. This system requires radar and data processing facilities which are not available in every geographic area.

Many of the prior location systems have nearly simultaneous signal transmissions from all the aircraft within a given airspace and create serious clutter and jamming problems when a large number of aircraft are present. It is recognized that conventional automatic direction finder systems and range measurement systems, such as the well-known VOR-DME and VOR-TACAN systems, enable an aircraft to accurately know its own angular bearing, or azimuth, and range with respect to a reference location. Many hyperbolic navigation systems, such as LORAN and DECCA, as well as various satellite-based systems, provide individual aircraft and other aircraft with their own positions. However, these systems do not provide an aircraft with information about the position of other aircraft in the same airspace so that collisions may be avoided.

SUMMARY OF THE INVENTION

It is therefore an object of this invention to provide an improved aircraft location system by which position information for all the aircraft within an airspace is economically made available for display on board those aircraft.

It is another object of this invention to provide a collision avoidance warning system for aircraft having conventional automatic direction finding and range measurement equipment.

It is another object of this invention to provide en route and terminal navigation capabilities to aircraft and control stations.

It is another object of this invention to provide visual position tracking capabilities for aircraft landings and approaches.

It is another object of this invention to provide passive airspace surveillance for air traffic control.

Basically, this invention provides an aircraft location and display system and method which provides for transmission of a signal at a time uniquely associated with the position of an aircraft. The azimuth scan function of a conventional VOR system is expanded in time, or slowed down, so that the improved system has an angular scan rate many times slower than a conventional system. Each degree of azimuth is assigned a time slot during which only those aircraft having that azimuth are permitted to transmit. The azimuth reference signals of a conventional system are used to derive the synchronizing and timing signals for the synthetic function. A range function, embedded in the synthetic azimuth function, encodes range as a time delay with respect to the conventional azimuth reference signals during the time slot corresponding to a one degree increment azimuth. The system provides a periodic synthetic azimuth reference signal which has a period that is an integral multiple of the period of the conventional azimuth reference signal. The conventional azimuth reference signal is, for example, the North reference signal, which occurs thirty times a second. The synthetic azimuth reference signal occurs every twelve seconds and an azimuth time slot has a duration of one-thirtieth of a second. The synthetic reference function synchronizes a display and alarm system for showing the position of aircraft within an airspace and for avoiding collisions.

BRIEF DESCRIPTION OF THE DRAWINGS

FIG. 1 is a pictorial representation of aircraft using a system according to the invention;

FIG. 2 is a polar plot representing the area mapped by the synthetic azimuth and range functions according to the invention;

FIG. 3 is a plot of an expanded synthetic azimuth function derived from a conventional azimuth function;

FIG. 4 is a plot of a synthetic azimuth function and a series of imbedded range functions according to the invention;

FIG. 5 is a plot representing the linear time expansion of the conventional azimuth function to the synthetic azimuth function;

FIG. 6 is a block diagram of a modified VOR-DME ground station;

FIG. 7 is a block diagram of a system for receiving and transmitting location information according to the invention;

FIG. 8 is a block diagram of a system according to the invention having altitude filtering and utilizing a microcomputer;

DETAILED DESCRIPTION OF THE PREFERRED EMBODIMENTS

Figure 9:
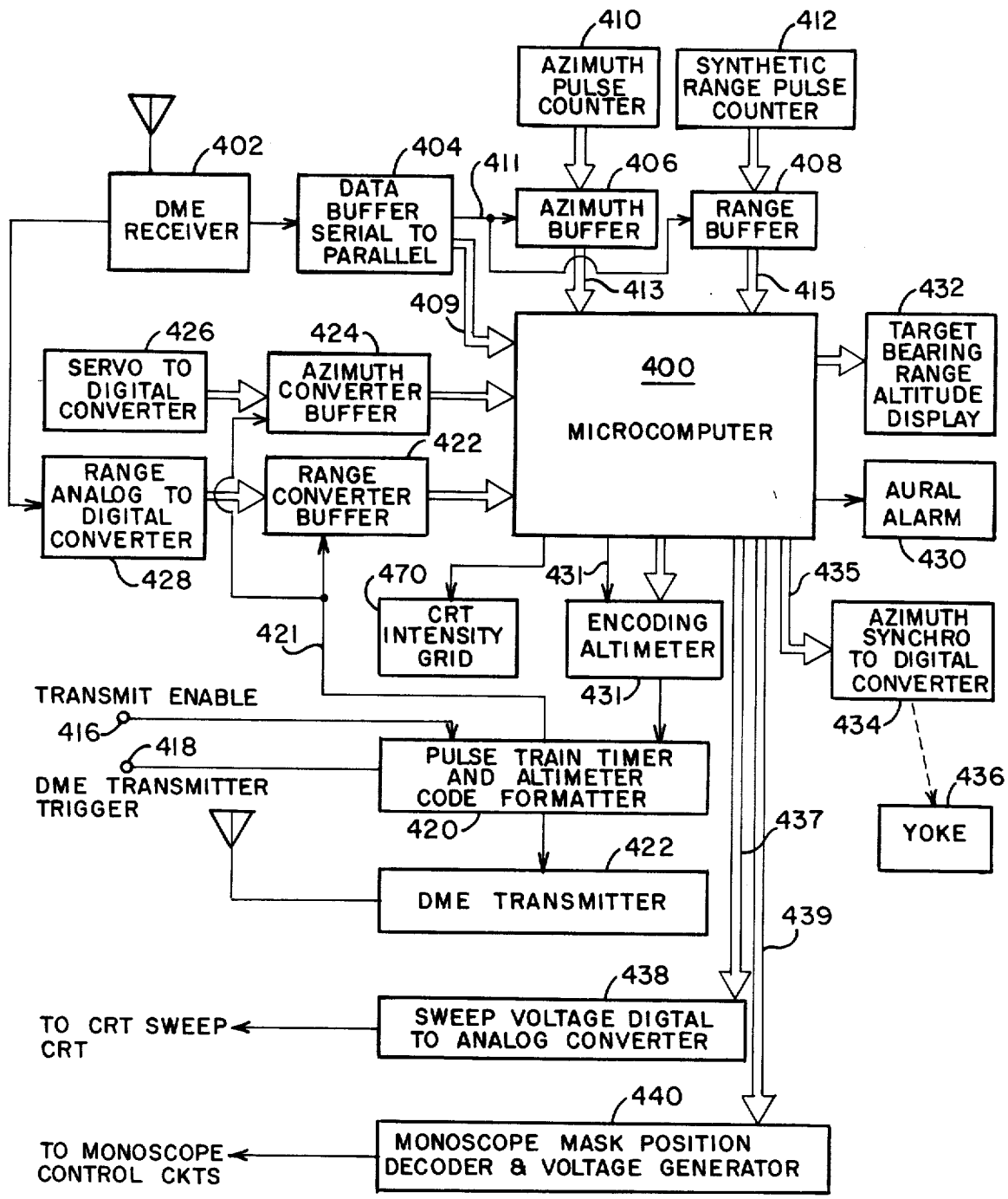
FIG. 9 is a block diagram of a system which further utilizes a microcomputer to operate a display.

FIG. 1 represents a parent aircraft 10 and a target aircraft 12 in an airspace covered by a conventional aircraft position determining system, such as a VOR-DME ground station 14. The aircraft use the conventional ground reference information signals as shown so that each aircraft 10, 12 knows its own position with respect to the ground station 14. Aircraft location signals provided according to the invention are shown passing between the aircraft and provide each aircraft with the other aircraft's position within the airspace. The transmissions occur at different times to avoid interference. Note that this invention is not necessarily limited to aircraft or aircraft-related systems but may also include surface craft, marine craft, space craft and other navigable vessels of various designs. The exemplary embodiments of the invention discussed in this patent application are described to illustrate the basic principles and concepts of the invention.

FIG. 2 is a polar plotted grid which graphically represents the ground area beneath an airspace covered by the system according to the invention. An aircraft's position in the airspace is described by a two-dimensional location on this grid and by an altitude value. A rotating radial vector 16 represents a synthetic azimuth scanning signal which maps the airspace once every 12 seconds and is a time-delayed version of a conventional VOR scanning function which periodically maps the airspace 30 times a second. A reference vector 18 is a North, or zero degree, reference vector. The time delay between the occurrence of the signal represented by the reference vector 18 and the occurrence of the signal corresponding to the vector 16 is proportional to the azimuth of the aircraft with respect to the ground station 14, which is represented as a point 20 on the grid. The distance of an aircraft from the ground station 14 is represented on the grid as a radial distance from the point 20, and the concentric circles represent aircraft positions equidistant from the ground station 14. A conventional DME system requires that an aircraft transmits an interrogation signal to the DME ground station 14 and that the DME ground station transmits a reply signal. The elapsed time between transmission of the interrogation signal and receipt of the reply signal is proportional to the distance between the aircraft and the ground station 14.

FIG. 3 graphically shows a representative portion of a synthetic azimuth function y(t') which is obtained by linearly transforming, or time-expanding, the time variable t of the conventional azimuth function y(t) by a factor k, where $t' = kt$. In this embodiment of the invention, k = 360, so that the period of the synthetic azimuth function is 12 seconds. The numbers along both the t and t' scale represent the increments of angular displacement from the North azimuth reference. The time intervals between the corresponding angular positions differ by a factor of 360 so that t and t' are not plotted with the same scale. FIG. 5 represents the linear transformation of the variable t into t' which transforms the VOR azimuth function into the synthetic azimuth function.

FIG. 4 partially shows a synthetic azimuth function y(t') as a function of t', with the t' axis being shown as broken. The analog version of this function is shown as a periodically repeating linear sawtooth function which encodes an aircraft's azimuth as the time delay with respect to a synthetic azimuth synthronizing pulse, which has a period of 12 seconds and which is obtained by counting 360 VOR system reference pulses. The digital version of the synthetic azimuth function is a periodically repeating staircase function having the step transitions occur at one degree azimuth increments.

FIG. 4 also shows the synthetic range function f(t') as a function of t'. A series of periodically repeating synthetic range synchronization pulses are derived from the VOR system synchronizing pulses which occur 30 times a second. Note that the synthetic synchronization pulses provide one-degree increments for the synthetic azimuth function.

Range is represented in FIG. 4 in analog fashion as a periodically repeating, linear sawtooth function which utilizes the one-degree synthetic azimuth increments to encode range as a time delay with respect to each of the synthetic range synchronization pulses shown in FIG. 4. The synthetic range function f(t') is thus described as being imbedded in the synthetic azimuth function. To avoid possible confusion caused by signal transmission time delays, a dead time is shown at the end of each synthetic range prior to each synthetic range synchronizing pulse. The digital version of the synthetic range function is a periodically repeating staircase function, with the steps occuring at convenient range increments.

The position of an aircraft is thus uniquely encoded as a time delay with respect to the synthetic azimuth reference pulse and to one of the synthetic range pulses. The digital version of the invention provides each aircraft with a one-degree azimuth time slot during which an identification signal is transmitted at a time representing an increment of range with respect to the ground reference station.

MODIFIED VOR-DME GROUND STATION

A conventional ground-based VOR system is modified and supplemented as indicated by the block diagram of FIG. 6. A VOR reference signal from a VOR tone wheel pick-up circuit 100 is amplified by the amplifier circuit 102 and fed to an F.M. detector 104 which produces a 30 Hz VOR system reference signal on the signal line 105. The 30 Hz reference signal is fed to an amplifier/clipper circuit 106 which provides a 30 Hz square wave. The positive-going edge of the square wave is differentiated by the differentiator circuit 108 and the resultant pulse is applied to a digital counter 110 which counts 360 pulses before being reset. On the 360th count, the counter produces an output signal on line 111 which actuates a sub-carrier tone generator 112 which produces a tone burst which is fed to the amplitude modulation input of a conventional VOR transmitter 114. The amplitude-modulated tone burst occurs every 12 seconds and is the synthetic azimuth synchronizing signal for the system. This signal serves as the North, or zero-degree, reference for the synthetic azimuth function.

Note that the VOR system operates in a conventional manner to provide aircraft with azimuth information and the modifications as described do not affect its conventional operation. A conventional DME transponder 116 operates in a conventional manner so that aircraft are provided with range information.

THE FIRST EMBODIMENT

FIG. 7 shows a conventional VOR aircraft receiver 200 which provides a detected amplitude modulated output on signal line 201. A band pass filter 202 passes the detected synthetic azimuth synchronizing sub-carrier tone burst signal, which is transmitted by the VOR transmitter 114 once every 360 cycles of the conventional VOR reference signal, or every 12 seconds. The detected sub-carrier tone burst is applied to a synthetic azimuth synchronization detector circuit 204 and the resulting output pulse is applied to a counter zero reset circuit 206 which resets the output of a VOR azimuth reference pulse counter 208 to zero. The output of the reset circuit 206 corresponds to the synthetic azimuth synchronization reference signal provided every 12 seconds.

The VOR receiver 200 also provides a 30 Hz VOR reference signal to a VOR reference signal pulse shaper circuit 210 where the 30 Hz reference signal is amplified, clipped and differentiated on its positive-going edge with the resultant pulse being applied to the input of the counter 208, which counts 360 pulses before being reset by the signal representing the synthetic azimuth reference signal.

The output signal from the VOR reference signal pulse shaper circuit 210 corresponds to the synthetic range synchronizing pulse and is applied to a range pulse generator enable circuit 212 and to a display-sweep trigger circuit 214. The display-sweep trigger circuit 214 provides a trigger pulse for synchronizing a CRT display sweep circuit. The binary outputs of the counter 208 digitally represent one of 360 possible azimuth increments of a synthetic azimuth function having a period of 12 seconds. The signals are fed by the signal bus 209 to a digital-to-synchro converter 211 wherein the binary signals are converted to synchro voltages which are fed to a yoke synchro driver circuit 216. The yoke synchro driver circuit 216 is mechanically coupled to a display CRT yoke 218 and provides an azimuth scan for the conventional CRT display (not shown). With a 12-second azimuth scan time required by the time domain transformation, a special long-persistance display is required. Alternatively, the display may be provided a conventional bright display used in conjunction with a scan-converter storage tube. The storage tube is scanned as rapidly and as frequently as desired, and its output is applied to a short persistence, high light-output CRT.

Azimuth information for an aircraft is obtained from the VOR receiver 200. Azimuth signals are fed from the VOR receiver 200 on a signal line 219 to a null-seeking resolver servo motor control circuit 220. The course deviation signals and the TO-FROM output signal of the VOR receiver 200 on signal line 221 drives the servo motor so that a servo-to-digital converter 222, which is coupled mechanically to the servo motor, provides output signals on the output data buss 223. The signals are binary coded representation of an aircraft's current bearing, or azimuth, with respect to a reference North direction from the VOR ground station. The binary coded output signal represents azimuth values in increments of one degree. The output signals of the servo-to-digital converter 222 are fed to one input of an azimuth digital comparator circuit 224, which uses an exclusive NOR logic configuration. The other input to the digital comparator circuit 224 is the binary outputs of the counter 208, which represents the synthetic azimuth function. When the two inputs to the digital comparator circuit 224 are identical, an output coincidence pulse is generated and is applied to a DME transmitter enable latch circuit 228. This occurs when the synthetic azimuth function value provided by the counter 208 equals the azimuthal position of the aircraft provided by the VOR receiver. The latch circuit 228 arms a pulse train timer and code formatter circuit 230 so that, when a trigger pulse is later received on line 231, an output is provided on a signal line 233 which activates and provides an appropriately coded signal to a conventional DME transmitter circuit 232. The DME transmitter circuit 232 provides an encoded output signal which has a time delay with respect to the synthetic azimuth synchronization reference signal, which delay is indicative of the aircraft's azimuth. The output signal falls within one of the 360 one-degree time slots.

The range, or distance, information for an aircraft with respect to the DME ground station is provided during the appropriate one of the azimuthal time slots as follows: A dual DME receiver 234 aboard the aircraft provides an analog voltage on signal line 235 which indicates the range of the aircraft from the VOR-DME ground station. This analog voltage is applied to a range analog-to-digital converter 236 which provides a binary output signal indicative of the aircraft's range. The output of the range analog-to-digital converter 236 is applied on the data buss 237 to a synthetic range digital comparator circuit 238. The other input to the range digital comparator circuit 238 is fed on the data buss 239 from a range counter circuit 240, which generates a synthetic range function as a series of digitally encoded output words. The range counter circuit 240 is supplied with input pulses from a crystal-controlled pulse generator 242. Both the range counter 240 and the crystal-controlled pulse generator 242 are enabled by an output from the pulse generator enable circuit 212 which is enabled by the VOR reference signals. The pulse generator enable circuit 212 synchronizes the synthetic range function and the CRT display range sweep with the synthetic range reference pulse. The crystal-controlled pulse generator 242 operates at a frequency sufficiently high so that a sufficient number of range increments are available. For example, if range is determined with 10 bit accuracy by the range analog-to-digital converter circuit 236, the operating frequency of the crystal-controlled pulse generator 242 is chosen so that the appropriate number of range increments are provided during the time interval between two 30 Hz synthetic range reference pulses, which is 33,333.3 microseconds. To allow for dead time at the end of each range sweep, the synthetic range function maximum delay is chosen to be 32,000 microseconds. For each 32,000 microsecond interval, the crystal-controlled pulse generator 242 provides pulses at a rate sufficient to cycle the range pulse counter 240 through all the binary code words required. If the maximum range is chosen as 100 miles and if range increments of one-tenth of a mile are desired, then ten-bit accuracy is required and the pulse generator 242 must provide pulses with a period of approximately 32 microseconds.

When the actual range of the aircraft as provided by the DME receiver on the data bus 237 equals the output of the range counter 240 provided on data bus 239, the synthetic range comparator circuit 238 provides an output pulse to the DME transmitter trigger circuit 253, which activates the pulse train timer and code formatter circuit 230. The circuit 230 has been previously armed by a signal from the DME transmitter enable latch circuit 228 to transmit an output pulse or series of encoded pulses in the 33,333.3 microsecond time slot corresponding to an aircraft's azimuth. The exact time of transmission within the azimuth time slot is determined by the output of the synthetic range comparator circuit 238. Range information is thus embedded in one of the azimuth time slots.

In order to display the position of other aircraft on the display CRT screen, the dual DME receiver 234 provides an output on a signal line 243 at times which correspond to the location of those other aircraft. These signals are fed to an identification or pulse spacing detector circuit 244 which, for example, examines the signals pulse spacing to verify that the signals are from other aircraft using the location system. The pulse spacing detector 244 provides an output pulse for each other aircraft to a video driver amplifier 246 on a signal line 245. Another input line 247 provides the video driver amplifier 246 with a pulse indicative of the receiving aircraft's position. The output of the video driver amplifier drives the intensity grid of the CRT display (not shown). The positions of all the aircraft within an airspace are thus able to be displayed on a CRT screen. An aircraft equipped with a location system according to the invention is thus able to display the position of other similarly equipped aircraft along with its own position. The other aircraft use equipment for transmitting a pulse at a time corresponding to their location using equipment similar to that shown in FIG. 7.

THE SECOND EMBODIMENT

FIG. 8 shows a second embodiment of the invention which incorporates a microcomputer subsystem 300 to perform certain functions performed by the circuits of FIG. 7. This embodiment performs the same functions as described in the previous embodiment and, in addition, includes means which provide automatic collision-avoidance warnings.

An input terminal 301 of the pulse spacing detector 302, similar to the detector 244 of FIG. 7, receives aircraft location signals from a DME receiver. If the aircraft location signal is proper, the signal is fed to an altitude decoder circuit 304. If the aircraft is between certain altitudes, an indicative signal is applied to the CRT intensity grid through a video driver amplifier 306. Terminal 309 of an azimuth pulse counter 310 receives VOR reference pulses and generates a synthetic azimuth function, which is provided as binary coded signals on the data bus 311 to an azimuth counter buffer circuit 312. Synthetic range reference signals are fed from a suitable pulse generator to the input terminal 313 of a synthetic range pulse counter circuit 314, which generates a synthetic range function. The output of the counter circuit 314 is fed on a data bus 315 to a range counter buffer circuit 316. If the signal received by the altitude decoder 306 contains a proper altitude code, a signal is provided to load the azimuth counter buffer and the range counter buffer into a microcomputer 300 using data busses 321, 323. The altitude information code word is also loaded into the microcomputer 300 by means of the data bus 319. Thus, a target's azimuth, range, and altitude is entered into the microcomputer 300.

A pulse train timer and code formatter circuit 324, similar to the circuit 230 of FIG. 7, is actuated by a transmit enable signal at terminal 326. The transmit enable signal is provided from a circuit similar to the DME transmit enable latch circuit 228 shown in FIG. 7. To terminal 328 of the circuit 324 is applied a DME transmitter trigger signal similar to the signal provided by the DME transmitter trigger circuit 243 of FIG. 7. The pulse train timer and code formatter circuit 324 provides an output signal on data signal line 327 which causes a range converter buffer circuit 330 and an azimuth converter buffer circuit 332 to be loaded with the information provided by a servo-to-digital converter circuit 334 and a range analog to digital converter 336 using the respective data busses 333 and 335. The parent aircraft's azimuth and range information is loaded into the microcomputer 300 by means of the respective data busses 337 and 339. The signal on line 327 is also provided to the video driver amplifier circuit 306 for display upon the CRT screen. Altitude information is loaded into the pulse train timer and code formatter circuit 324 from an encoding altimeter 340. A DME transmitter 342 is actuated by an output signal on line 341 from the pulse train timer and formatter circuit 324 on the signal line 341 upon receipt of a DME transmitter trigger signal on terminal 328.

The microcomputer 300 in this embodiment performs calculations for converting the azimuth and range information signals delivered thereto for each of the other target aircraft and for the parent, or receiver, aircraft into rectangular coordinates relative to the VOR-DME location. The microcomputer then computes the range and bearing between the parent aircraft and other aircraft using conventional analytic geometry formula for computing the angle and distance between two points. If the distance between the parent aircraft and the other aircraft is less than a preset minimum, the microcomputer automatically causes an aural alarm 344 to be activated, providing an audible alarm signal to alert the parent aircraft to the situation. In addition, a display 346 provides a display of target bearing, range and altitude.

THE THIRD EMBODIMENT

FIG. 9 shows an embodiment of the invention which is similar to the two previously described embodiments except that functions performed by certain discrete circuits are performed by a microcomputer subsystem 400. In this embodiment, the CRT display control functions are provided by the microcomputer. This embodiment also utilizes the microcomputer for error correction, altitude filtering and generating collision avoidance alarms.

A DME receiver circuit 402 is connected to a data buffer circuit 404 which examines the received signals for proper pulse spacing and identifies those aircraft in the airspace using the location system. The data buffer circuit 404 converts encoded altitude information from serial to parallel form and provides it to the microcomputer 400 on the data bus 409. Signal line 411 provides an enable signal to an azimuth buffer circuit 406 and to a range buffer circuit 408 which are, respectively, loaded with synthetic azimuth and range function values from a synthetic azimuth pulse counter 410 and a synthetic range pulse counter 412. The outputs of the buffers are fed to the microcomputer 400 on the data busses 413, 415. A pulse train timer and altitude code formatter circuit 420 has a terminal 416 which receives a transmit enable signal and a terminal 418 which receives a DME transmitter trigger signal. The circuit 420 provides an encoded signal to the DME transmitter 422, which transmits a uniquely coded signal which includes the aircraft's identification information and altitude.

The coded signal includes, for example, an identification sequence of four coded pulses, each having a 9 microsecond duration, and an altitude sequence of eleven coded pulses, each having a 7 microseconds duration. The coded signal has a total duration of 113 microseconds, which represents approximately one-third mile of the synthetic range function.

The pulse train timer and altitude code formatter circuit 420 also sends a control signal on the data signal line 421 to a range converter buffer circuit 422 and to an azimuth converter buffer circuit 424 to input the aircraft's range and azimuth data to the microcomputer 400. These buffer circuits respectively contain the parent aircraft's digitally encoded azimuth and range information as provided by an azimuth servo-to-digital converter circuit 426 and a range analog-to-digital converter circuit 428. An encoding altimeter 430 is prompted by a signal from the microcomputer 400 on signal line 431 to provide the microcomputer 400 with the aircraft's encoded altitude information on the data signal lines 433. This is done coincident with the aircraft's azimuth and range information being entered into the microcomputer. Thus, all of the parent aircraft's bearing, range and altitude information is inputted to the microcomputer 400.

The microcomputer 400 converts the polar coordinates for the bearing and range of the parent aircraft and the target aircraft into rectangular coordinates. The range and bearing between the parent aircraft and each of the target aircraft is computed using rectangular coordinates and appropriate analytical geometry formulas. If the distance between the parent aircraft and another aircraft is less than a preset minimum, an aural alarm 430 is actuated by the microcomputer. In addition, the relative bearing range and altitude between the parent aircraft and the target aircraft are displayed on a target bearing, range and altitude display 432 controlled by the microcomputer. The microcomputer 400 also computes the range for each of the target aircraft and applies appropriate error correction factors to each of the target's range.

The microcomputer 400 provides a yoke-positioning digital signal to an azimuth digital-to-synchro converter circuit 434 on the data bus 435. The azimuth digital-to-synchro converter is mechanically coupled to the yoke 436 and the microcomputer 400 is programmed to fast slew the yoke to the next available target's azimuth value.

The microcomputer 400 also provides encoded output signals on a data bus 437 to a sweep voltage digital-to-analog converter circuit 438, the output signals of which drives the sweep circuits of a CRT display. The microcomputer 400 also provides coded digital output signals on a data bus 439 to a monoscope mask position decoder and voltage generator circuit 440 which provides a visual numeric display of target aircraft altitudes on the CRT screen.

The display is controlled by the microcomputer 400. The parent aircraft's position can be updated by the microcomputer 400 from the azimuth converter buffer 424 and the range converter buffer 422 at intervals more frequent than the 12-second update time associated with each of the target aircraft. The azimuth of the parent aircraft with respect to the VOR-DME location can be updated every 30th of a second and the range information can be updated as often as the DME range equipment is activated.

Figure 11:
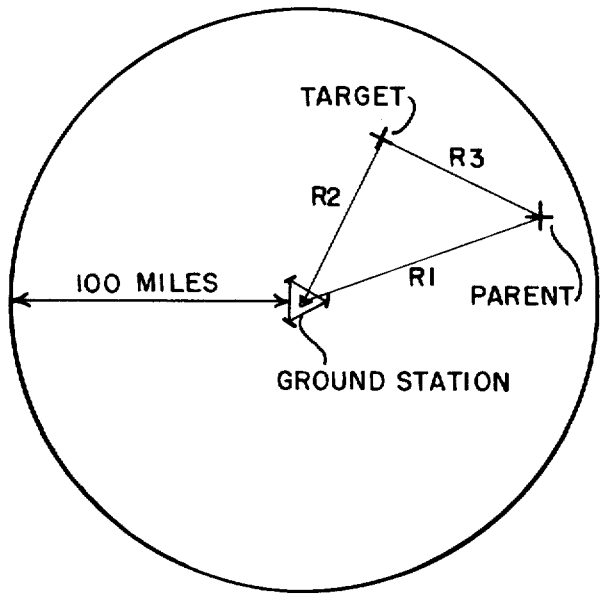
FIG. 11 is a diagram representing the distances between aircraft and a ground station which results in signal delays.

The microcomputer 400 is used to correct errors in determining the location of target aircraft. FIG. 11 shows a typical situation where signal transmission time delays introduce range errors into the location data. One error E1 is produced by the difference in signal transmission time between the ground station and the target aircraft and the parent aircraft. E1 equals the magnitude of the difference between the range R2 of the target aircraft and the range R1 of the parent aircraft multiplied by the travel time per mile of electromagnetic energy td1 and divided by the time delay per mile of the synthetic range function td2:

$$E1 = |R2 - R1| td1/td2.$$

Another error E2 is produced by the signal transmission time between the target aircraft and the parent aircraft. E2 equals the range R3 between the aircraft multiplied by the travel time per mile of electromagnetic energy td1 and divided by the time delay per mile of the synthetic range function td2:

$$E2 = R3 td1/td2.$$

The range error E is the algebraic sum of E1 and E2:

$$E = (|R2 - R1| td1 + R3 td1)/td2.$$

The equation for total error, E, does not permit the error to be reduced to zero since it contains an uncorrected target aircraft range R2 and, consequently, an uncorrected range between aircraft R3. However, the basic error equation may be iterated using corrected values of R2 and recomputed values of R3. As may be seen by an analysis of the iteration process, each succeeding iteration causes the total error, E, to converge quickly toward zero. For example, if each iteration is subtracted from the preceding iteration and the remainder, designated ($\Delta$Ei), is divided by E, then it can be shown that:

$$(\Delta Ei + 1)/E \leq (\Delta Ei/E)2$$

After the second iteration, $\Delta$Ei/E becomes extremely small. This is illustrated as follows:

The system measures R1 and R2 (R2 contains error). Both R1 and R2 are converted by the processor from polar to rectangular coordinates and also retained in polar form. Using the analytic geometry formula for distance between two points and the rectangular coordinates of R1 and R2, R3 is computed. E is then computed using the magnitude only of the polar form R1 and R2 and the computed magnitude of R3:

$$E = (|R2 - R1| td1 + R3 td1)/td2.$$

E is then substracted from the magnitude of R2 in polar form:

$$R2 - E = R2', \text{ to yield } R2'.$$

R3 is then recomputed to obtain R3', using R1 and R2' converted to rectangular coordinates.

E is then computed using R1, R2' and R3' magnitudes only in polar form:

$$E' = (|R2' - R1| td1 + R3' td1)/td2.$$

If R3' < R3, E' is added to R2' magnitude in polar form:

$$R2'+E'=R2''.$$

If $R3'>R3$, $E'$ is subtracted from $R2'$ magnitude in polar form:

$$R2'-E'=R2''.$$

$R3'$ is then recomputed to obtain $R3''$, using $R1$ and $R2''$ converted to rectangular coordinates.

$E''$ is then computed using $R1$, $R2''$ and $R3''$ magnitudes only in polar form:

$$E'=(|R2''-R1|td1+R3''td1)/td2$$

If $R3''<R3'$, $E''$ is subtracted from $R2''$ magnitude in polar form:

$$R2''-E''=R2'''$$

If $R3''>R3'$, $E''$ is added to $R2''$ magnitude in polar form:

$$R2''+E''=R2'''$$

$R3''$ is then recomputed to obtain $R3'''$, using $R1$ and $R2'''$ converted to rectangular coordinates.

The process is known as convergent iteration, and the error terms converge rapidly toward zero so that any error term after the second, ($E'$), becomes extremely small.

In embodiments 1, 2 and 3, the time delays produced by the error, described above, coupled with the time delay of the synthetic range function, previously described, would cause aircraft at ranges near the limit of the display system (100 miles) to exceed the allowable 33,333.3 microsecond synthetic range function time slot and be displayed as a target very close to the VOR-DME station rather than 100 miles distant. This situation may be eliminated by reducing the synthetic range function time domain by an amount slightly greater than the maximum total error time delay given by the equations above. This results in a "dead time" at the end of each synthetic range function time domain. In the system previously described, for example, the time domain of $f(t')$ range could be set to 32,000 microseconds with a 1333.3 microsecond "dead time." This would eliminate such false target indications on the receiving displays.

THE FOURTH EMBODIMENT

Figure 10:
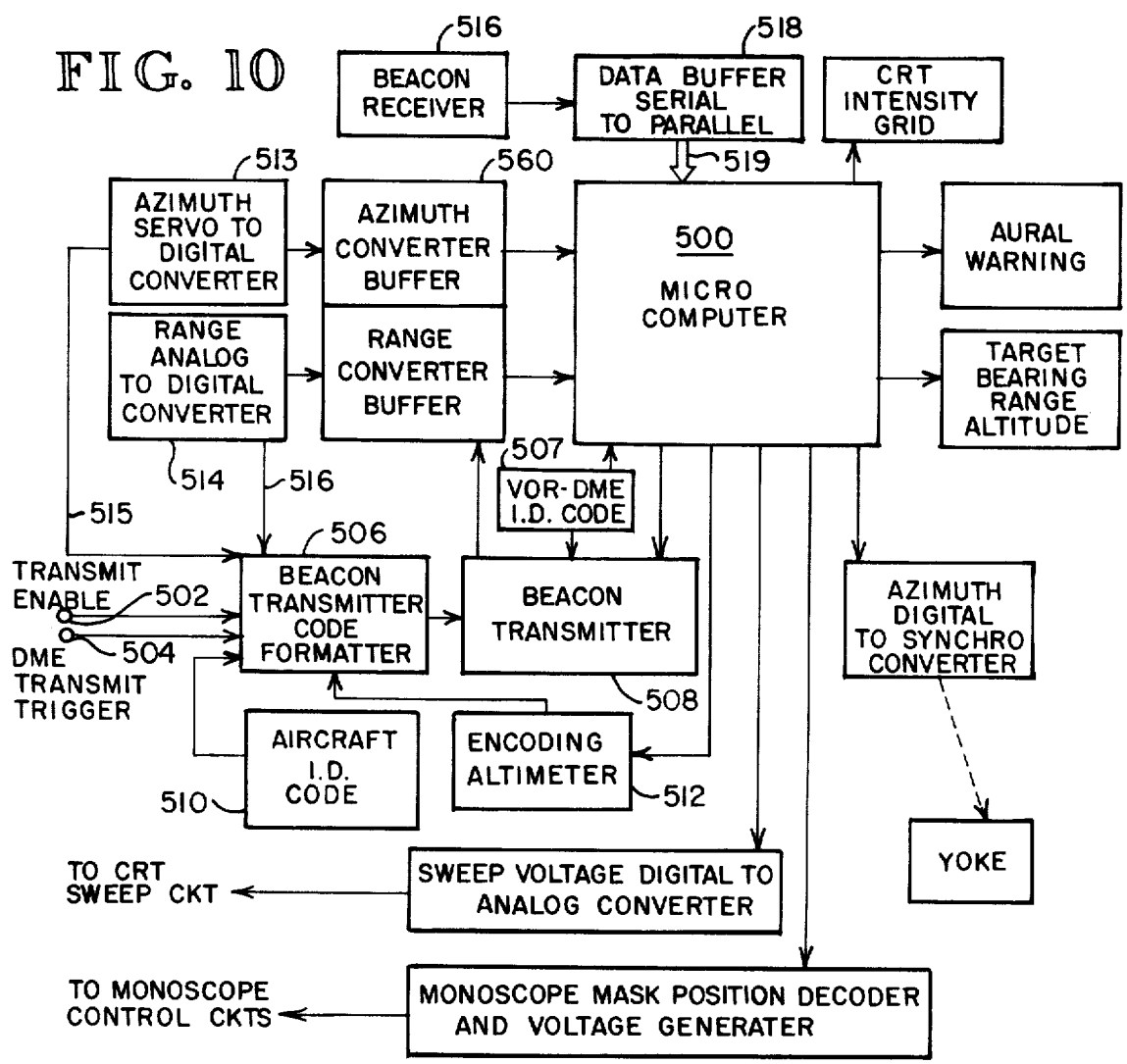
FIG. 10 is a block diagram of another embodiment of the invention utilizing a microcomputer.

FIG. 10 shows an embodiment of the invention which uses only the transmitter enable signal and the DME transmitter trigger signal of the first embodiment, shown in FIG. 7. A separate beacon transmitter and beacon receiver on each aircraft are utilized and the DME transmitter and receivers are not used to process aircraft location information. The enable and trigger signals are respectively applied to terminals 502, 504 of a beacon transmitter code formatter circuit 506, which provides a beacon transmitter 508 with a signal containing all of the information necessary to identify an aircraft. A VOR-DME system identification code signal from a circuit 507 identifies the ground-based VOR-DME reference system being used to avoid confusion with adjacent systems. Each aircraft has an identification code provided by an aircraft ID code circuit 510. An encoding altimeter circuit 512 provides altitude information. An azimuth servo-to-digital converter circuit 513 and a range analog-to-digital converter circuit 514 provide appropriately coded azimuth and range signals to the code formatter circuit 506 on respective signal lines 515, 516.

All identification and location information is transmitted by an aircraft in the time slot uniquely associated with its azimuth and range. This prevents interference between aircraft transmissions. A beacon receiver 516 receives that information from each transmitting target aircraft. The information is fed to a serial-to-parallel data buffer 518, the output of which is provided to a microcomputer 500 on a data bus 519. The microcomputer 500 provides the same display and alarm functions as provided by the system of FIG. 9, except for range error compensation, which is not required because each aircraft transmits accurate encoded location information and a receiving aircraft is not required to compensate for transmission delays. As in the third embodiment described in FIG. 9, a parent aircraft's position may be updated quite frequently while the target aircraft's positions are updated once every 12 seconds.

OTHER APPLICATIONS

A ground-based receiver system monitors the signals transmitted by aircraft using this invention and provides location data to air route traffic control centers so that the relative positions of aircraft within a given area are displayed on monitors. For route navigation purposes, airway transparencies are overlayed on the monitor display screens. The transparencies include, for example, high and low altitude route charts which provide aircraft monitoring with a 100-mile range. Expanded, shorter range monitoring is also available. Approach plates permit instrument-landing approaches to be flown by using the system according to the invention to display an aircraft's position on a display screen.

While particular embodiments and methods of the invention have been shown and described, it should be understood that the invention is not limited thereto since many modifications may be made. It is therefore contemplated to cover by the present application any and all such modifications that fall within the true spirit and scope of the basic underlying principles disclosed and claimed herein.

I claim:

1. A system enabling a parent aircraft to determine the location of a target aircraft, comprising:
   first means aboard a parent aircraft and a target aircraft, each for generating a synthetic azimuth function which is a time-expanded version of a periodic azimuth function describing the aircraft's azimuth as a time-delay with respect to the occurrence of an azimuth reference signal;
   second means aboard the parent aircraft and target aircraft, each for generating a time expanded synthetic range function, which function describes the aircraft's range as a time-delay with respect to the occurrence of a range reference signal;
   means for providing the target aircraft with a signal representative of its azimuth with respect to a reference position and for providing the target aircraft with a signal representative of its range with respect to the reference position;
   transmitter means aboard the target aircraft for transmitting an output signal at a time when the target aircraft's representative azimuth and range signals correspond, respectively, to the synthetic azimuth and synthetic range functions; and means aboard the parent aircraft for comparing the transmitted output signal from the target aircraft to the synthetic azimuth function and to the synthetic range function generated by the first and second means aboard the parent aircraft and providing an output signal to the operator of the parent aircraft indicative of the location of the target aircraft.

2. The system of claim 1, wherein the comparing means aboard the parent aircraft includes computer means.

3. The system of claim 2, wherein a visual display system is provided aboard the parent aircraft which is synchronized by a series of periodically repeating signals derived from a conventional system synchronizing signal, this synchronizing signal also synchronizing the synthetic azimuth function and the synthetic range function and which provides a visual display of the location of the target aircraft.

4. The system of claim 1, wherein the synthetic azimuth function has a period which is a multiple of the period of the azimuth function.

5. The system of claim 1, wherein the transmitter means includes means for encoding the target aircraft's altitude in the transmitted output signal and wherein the parent aircraft contains means for enabling the comparator means when a preset altitude code is received.

6. The system of claim 1, including alarm means on board the parent aircraft which is actuated in response to receipt of a transmitted output signal indicative of the target aircraft being within a predetermined distance from the parent aircraft.

7. The system of claim 1, including means for correcting for the time delays due to the time required for radio frequency energy to travel over finite distances.

8. An aircraft location system which utilizes conventional position determining equipment providing output signals having azimuth and range information with respect to a fixed reference location, said conventional position determining equipment also providing a periodic azimuth synchronization signal, comprising:

first means for generating a synthetic azimuth function, which function is a time-expanded version of a conventional periodic azimuth function, said generating means including means for generating a periodic synthetic azimuth synchronization signal from the periodic azimuth synchronization signal, said synthetic azimuth function describing an aircraft's azimuth as a time delay with respect to the occurrence of the periodic synthetic azimuth synchronization signal, said first generating means providing an output signal representative of the synthetic azimuth function;

second means for generating a synthetic range function which describes an aircraft's range as a time delay with respect to the occurrence of one of the conventional periodic azimuth reference signals, said second generating means providing an output signal representative of the synthetic range function;

means for encoding an aircraft's position in terms of the synthetic azimuth function and in terms of the synthetic range function, said encoding means providing an output signal at a time, measured from the periodic synthetic azimuth synchronization signal, corresponding to the aircraft's position;

comparator means for comparing the synthetic azimuth function signal to the encoded aircraft azimuth output signal and for comparing the synthetic range function signal to the encoded aircraft range output signal, said comparator providing and output signal indicative of the coincidence of the respective signals being compared so that the location of an aircraft in terms of the synthetic azimuth function and the synthetic range function is obtained.

9. The system of claim 8, including transmitting means responsive to the comparator means output signal.

10. The system of claim 8, wherein the signals compared by the comparator means are encoded digital signals.

11. The system of claim 10, wherein the comparator means includes computer means.

12. A location system for an aircraft, comprising:

a transmitter at a fixed location providing a periodically pulsed synthetic azimuth reference synchronizing signal and also providing a periodically pulsed synthetic range reference synchronizing signal having a period which is a sub-multiple of the period of the synthetic azimuth reference synchronizing signal, said synthetic range reference synchronizing signals providing equal synthetic azimuth degree increments;

means for providing the azimuth and range information of the aircraft with respect to the transmitter location;

means for encoding the azimuth of the aircraft with respect to the transmitter location as a synthetic azimuth pulse having a time delay with respect to the synthetic azimuth reference synchronizing signal, which time delay is proportional to the azimuth of the aircraft with respect to the transmitter location;

means for encoding the range of the aircraft as a synthetic range pulse having a time delay with respect to the synthetic range reference synchronizing signal, which time delay is proportional to the range of the aircraft from the transmitter location;

means for transmitting an aircraft location signal at a time corresponding to the simultaneous occurrence of the synthetic azimuth pulse and the synthetic range pulse;

means for receiving said aircraft location signal and for decoding the azimuth information and the range information to obtain the position of the aircraft with respect to the transmitter at the fixed location; and means for displaying the position of the aircraft relative to the transmitter location.

13. The system of claim 12, wherein the means for transmitting the aircraft location signal is on a first aircraft and the receiving and decoding and display means are on a second aircraft so that the first aircraft's position is provided to the second aircraft.

14. The system of claim 13, wherein the second aircraft includes means providing azimuth and range information of the second aircraft with respect to the reference transmitting means, and includes means for displaying the position of the second aircraft relative to the transmitter at the fixed location.

15. The system of claim 14, including means for computing the distance between the first and the second aircraft and means for indicating that said aircraft are within a predetermined distance of each other.

16. The system of claim 15, including means for correcting for the time delays due to the time required for radio frequency energy to travel over finite distances.

17. A method for providing information about the location of an aircraft, comprising the steps of:
- generating a first synthetic function which is a transformed version of a first conventional function and which describes one coordinate of the aircraft's position;
- synchronizing the first synthetic function with a first synchronizing pulse derived from signals from the first conventional function;
- generating a second synthetic function which describes another coordinate of the aircraft's position;
- synchronously starting and stopping the second synthetic function within the time required for a predetermined degree change in the first synthetic function by synchronizing the second synthetic function with pulses which are derived from signals from the first conventional function; and
- transmitting a pulse at a time when the value of the first synthetic function and the second synthetic function corresponds to the coordinates of the aircraft's position.

18. The method of claim 17, wherein the first synthetic function is a linear transformation of the first conventional function.

19. The method of claim 18, including generating the first synthetic function as a time-expanded azimuth function with respect to a reference point and including generating the second synthetic function as a range function with respect to the reference point.

20. The method of claim 19, including synchronizing the first synthetic function by generating a synthetic azimuth synchronizing signal derived from the first conventional function.

21. A method of air collision avoidance, comprising the steps of:
- time encoding azimuth information by generating a synthetic azimuth function which expands the time period for a conventional azimuth function from 1/30th of a second to a greater number of seconds, azimuth information being encoded as a time delay with respect to a synthetic reference azimuth synchronizing pulse which occurs once for every 360 conventional azimuth synchronizing pulses;
- encoding range information by generating a synthetic range function which makes range information proportionate to a time delay with respect to the most recently occurring azimuth synchronizing pulse; and
- transmitting a signal from an aircraft, the time of which signal, measured from the occurrence of the synchronizing pulses of the synthetic azimuth and range functions, respectively, is indicative of the aircraft's position in terms of the synthetic azimuth and range functions.

22. A method for expanding the azimuth resolution of a conventional polar-scanned vehicle position determining system which transmits a periodic signal reference, comprising the steps of:
- generating a synthetic azimuth scan function having an angular scan rate which is a sub-multiple of the conventional polar-scanned system angular scan rate; and
- encoding range information by making range information proportional to the start of the conventional polar-scanned system angular reference position signal, which is used to produce a range synchronizing signal.

23. A method for enabling a parent aircraft to determine the location of a target aircraft, comprising the steps of:
- generating a synthetic azimuth function, which function is a time-expanded version of a periodic azimuth function describing an aircraft's azimuth as a time-delay with respect to the occurrence of an azimuth synchronizing signal;
- generating a synthetic range function, which function describes an aircraft's range as a time-delay with respect to the occurrence of a range synchronizing signal;
- providing the target aircraft with a signal representative of its azimuth with respect to a reference location and providing the target aircraft with a signal representative of its range with respect to the reference location;
- transmitting an output signal at a time when the target aircraft's representative azimuth and range signals correspond to the synthetic azimuth and synthetic range functions, respectively; and
- comparing the transmitted output signal to the synthetic azimuth function and to the synthetic range function to provide an output signal indicative of the location of the target aircraft.

24. The method of claim 23, wherein the comparison step includes making the comparison by means of a computer.

25. The method of claim 23, including the step of providing a visual display system which is synchronized by the synthetic azimuth function and the synthetic range function to provide a visual display of the location of the target aircraft.

26. The method of claim 23, wherein the step of generating the synthetic azimuth function includes providing the synthetic azimuth function with a period which is a sub-multiple of the period of the azimuth function.

27. The method of claim 23, including the steps of encoding the target aircraft's altitude in the transmitter output signal and the step of enabling the comparator means when one of a preset range of altitude codes is received.

28. The method of claim 23, including actuating an alarm on board the parent aircraft in response to receipt of a transmitted output signal indicative of the target aircraft's being within a predetermined distance from the parent aircraft.

29. A method for providing the location of an aircraft, comprising the steps of:
- providing a transmitter at a fixed location which transmits a periodically pulsed synthetic azimuth reference synchronizing signal;
- providing a periodically pulsed synthetic range reference synchronizing signal having a period which is an integer submultiple of the period of the synthetic azimuth reference synchronizing signal to provide equal synthetic azimuth degree increments;
- providing azimuth and range information of the aircraft with respect to the transmitter location;
- encoding the azimuth of the aircraft with respect to the transmitter location as a synthetic azimuth pulse having a time delay with respect to the synthetic azimuth reference synchronizing signal so that the time delay is proportional to the azimuth of the aircraft;

encoding the range of the aircraft as a synthetic range pulse having a time delay with respect to one of the synchronizing range reference synchronizing signals so that the time delay is proportional to the range of the aircraft from the transmitter location;

transmitting an aircraft location signal at a time corresponding to the simultaneous occurrence of the synthetic azimuth pulse and the synthetic range pulse;

receiving the aircraft location signal and decoding the azimuth information and the range information to obtain the position of the aircraft with respect to the transmitter at the fixed location; and displaying the position of the aircraft.

30. The method of claim 29, including the steps of transmitting the aircraft location signal from a first aircraft and the steps of receiving, decoding and displaying on a second aircraft so that the first aircraft's position is provided to the second aircraft.

31. The method of claim 30, including the step of providing azimuth and range information for the second aircraft with respect to the reference transmitter and including the step of displaying the position of the second aircraft relative to the transmitter.

32. The method of claim 31, including the step of computing the difference between the first and second aircrafts and indicating that said vehicles are within a predetermined distance from each other.

33. The method of claim 32, including the step of correcting for the time delays due to the time required for radio frequency energy to travel over finite distances.

* * * * *